United States Patent
Meese-Marktscheffel et al.

(10) Patent No.: US 12,391,571 B2
(45) Date of Patent: Aug. 19, 2025

(54) METHOD FOR PREPARING AMMONIUM METATUNGSTATE

(71) Applicant: H.C. Starck Tungsten GmbH, Munich (DE)

(72) Inventors: Julia Meese-Marktscheffel, Goslar (DE); Armin Olbrich, Seesen (DE); Anja Weiland, Langelsheim (DE); Frank Van Der Pütten, Goslar (DE); Tino Säuberlich, Bad Harzburg (DE); Tobias Schröer, Bad Harzburg (DE); Jürgen Müller, Pforzheim (DE)

(73) Assignee: H.C. Starck Tungsten GmbH, Munich (DE)

( * ) Notice: Subject to any disclaimer, the term of this patent is extended or adjusted under 35 U.S.C. 154(b) by 694 days.

(21) Appl. No.: 17/311,432

(22) PCT Filed: Dec. 18, 2019

(86) PCT No.: PCT/EP2019/086077
§ 371 (c)(1),
(2) Date: Jun. 7, 2021

(87) PCT Pub. No.: WO2020/127571
PCT Pub. Date: Jun. 25, 2020

(65) Prior Publication Data
US 2021/0340023 A1   Nov. 4, 2021

(30) Foreign Application Priority Data
Dec. 19, 2018   (EP) ..................... 18213826

(51) Int. Cl.
*C01G 41/00* (2006.01)
*B01D 61/02* (2006.01)
(Continued)

(52) U.S. Cl.
CPC ......... *C01G 41/006* (2013.01); *B01D 61/025* (2013.01); *B01D 61/026* (2022.08);
(Continued)

(58) Field of Classification Search
CPC .. C01G 41/006; B01D 61/025; B01D 61/026; B01D 61/10; B01D 63/10; C02F 1/441; C02F 2101/20
See application file for complete search history.

(56) References Cited

U.S. PATENT DOCUMENTS

| 4,612,181 A | 9/1986 | Boyer et al. |
| 5,178,848 A | 1/1993 | Duyvesteyn et al. |

(Continued)

FOREIGN PATENT DOCUMENTS

| CN | 102061384 A | * | 5/2011 |
| CN | 105217688 A | * | 1/2016 |

(Continued)

OTHER PUBLICATIONS

"Reverse Osmosis vs Nanofiltration Membrane: What is the Difference?" Samco. <https://samcotech.com/reverse-osmosis-vs-nanofiltration-membrane-process-what-is-the-difference/> Accessed Jan. 2, 2024. Online Apr. 20, 2017.*

(Continued)

*Primary Examiner* — Richard M Rump
(74) *Attorney, Agent, or Firm* — Dority & Manning. P.A.

(57) ABSTRACT

The present invention relates to a process for preparing ammonium metatungstate using a reverse osmosis cell, and to a device for performing the process according to the invention.

13 Claims, 1 Drawing Sheet

(51) Int. Cl.
*B01D 63/10* (2006.01)
*C02F 1/44* (2023.01)
*C02F 101/20* (2006.01)

(52) U.S. Cl.
CPC .............. *B01D 63/10* (2013.01); *C02F 1/441* (2013.01); *C02F 2101/20* (2013.01)

(56) References Cited

U.S. PATENT DOCUMENTS

| | | | |
|---|---|---|---|
| 7,077,962 B2* | 7/2006 | Pipes | C02F 1/444 210/651 |
| 7,794,686 B2 | 9/2010 | White | |
| 8,101,074 B2 | 1/2012 | Larsen | |
| 2009/0294361 A1 | 12/2009 | Larsen | |
| 2010/0040532 A1 | 2/2010 | White | |

FOREIGN PATENT DOCUMENTS

| | | |
|---|---|---|
| DE | 3743267 A1 | 6/1989 |
| DE | 10320368 A1 | 11/2004 |
| EP | 0 070 059 A1 | 6/1982 |
| EP | 0 193 171 A2 | 9/1986 |
| EP | 0 200 170 A2 | 11/1986 |
| EP | 2 463 238 A1 | 6/2012 |
| JP | S 5867303 A | 4/1983 |
| JP | S 61119104 A | 6/1986 |
| JP | S61201625 A | 9/1986 |
| JP | 2013500924 A | 1/2013 |
| RU | 2129527 C1 | 4/1999 |
| WO | WO 2004/099087 A1 | 11/2004 |
| WO | WO 2006/043884 A1 | 4/2006 |

OTHER PUBLICATIONS

Liu et al., "Study on new method of the preparation of pure ammonium metatungstate (AMT) using a coupling process of neutralization-nanofiltration-crystallization", Journal of Membrane Science, vol. 240, No. 1-2, Sep. 1, 2004, pp. 1-9.
International Search Report for PCT/EP2019/086077, dated Jan. 28, 2020, 2 pages.
Russian Search Report, for PCT/EP2019/086077, dated Dec. 8, 2021, 2 pages.

* cited by examiner

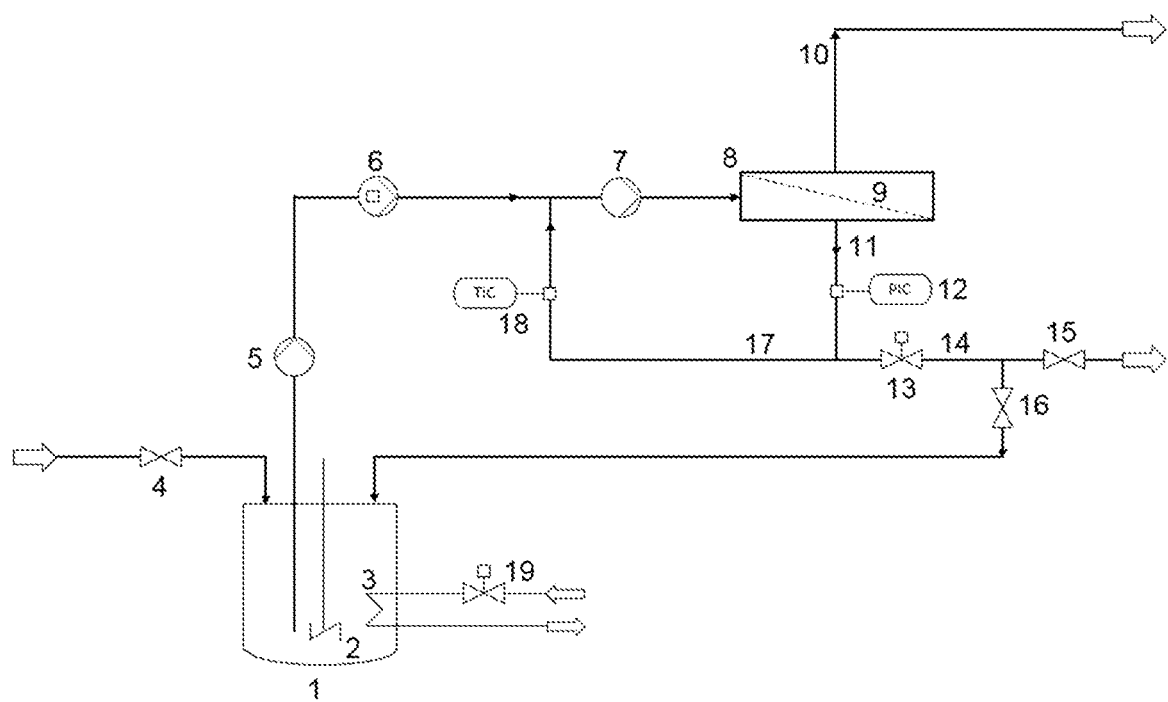

METHOD FOR PREPARING AMMONIUM METATUNGSTATE

CROSS REFERENCE TO RELATED APPLICATIONS

This application is the national stage entry of International Patent Application No. PCT/EP2019/086077 having a filing date of Dec. 18, 2019, which claims priority to and the benefit of European Patent Application No. 18213826.3 filed in the European Patent Office on Dec. 19, 2018, the entire contents of which are incorporated herein by reference.

The present invention relates to a process for preparing ammonium metatungstate using a reverse osmosis cell, and to a device for performing the process according to the invention.

Ammonium metatungstate (AMT) is used, inter alia, for the production of catalysts. Various methods, which may be divided into the categories of solid and liquid material transformations, are available for the preparation of ammonium metatungstate. Typically, the solid material transformation includes a thermal degradation process of ammonium paratungstate (APT), while ammonium paratungstate is degraded to ammonium metatungstate by acidification when the transformation takes place in a liquid phase.

DE 3743267 relates to a process for preparing ammonium metatungstate with an ignition loss of 5.6 to 5.9% by weight by annealing ammonium paratungstate in roasting aggregates at temperatures of 150 to 400° C., followed by leaching the roasted product obtained with water, wherein, in order to obtain the sought ignition loss, roasted products with an ignition loss of less than 5.6% by weight and roasted products with an ignition loss of more than 5.9% by weight may also be mixed together proportionately so that the ignition loss of the mixture is within the claimed range, and high yields are obtained thereby.

EP 0193171 discloses a process for preparing ammonium metatungstate from ammonium paratungstate, which includes heating ammonium paratungstate at a temperature of from 200 to 400° C., digesting the heated ammonium paratungstate in water to form an aqueous ammonium metatungstate solution, evaporating the solution of ammonium metatungstate to form a concentrated ammonium metatungstate solution, separating insolubles from the concentrated ammonium metatungstate solution, and crystallizing ammonium metatungstate from said concentrated ammonium metatungstate solution.

U.S. Pat. No. 7,794,686 describes a process for preparing ammonium metatungstate, which includes the preparation of a mixture of solid ammonium paratungstate and water. The mixture is contacted with a cation-exchange material to lower the pH of the mixture to a range in which the ammonium metatungstate ion is stable, and the formation of insoluble tungstic acid is prevented. The mixture is then maintained at this pH until a substantial part of the ammonium paratungstate has been converted to an ammonium metatungstate solution. The implementation of this process on an industrial scale is found to be very complicated because of the ion exchanger employed, because the latter must be regenerated with acid, and the solutions of ammonium salts formed thereby cannot be simply drained into a receiving water, but must be recycled.

EP 0200170 describes a method for producing ammonium metatungstate from ammonium paratungstate, wherein said method involves roasting the ammonium paratungstate at a temperature of from 275 to 300° C., and forming a sludge. The sludge is evaporated to 20% of its original volume to obtain a concentrated ammonium metatungstate solution, from which insolubles are separated off. As a last step, the method described includes crystallizing ammonium metatungstate from the concentrated ammonium metatungstate solution. Within the scope of the method described, it is considered particularly advantageous to perform the leaching of the roasted material at very low concentrations of less than 12 g/L, in order to achieve high overall yields.

These known methods for preparing ammonium metatungstate have in common that they can be performed only with a considerable consumption of energy because of the evaporation steps required. Therefore, within the scope of the current efforts to improve the sustainability of established production processes, there is a need for a production process for ammonium metatungstate that requires a lower consumption of energy.

In the production of different tungstate compounds, a number of alternative methods of concentrating have been described.

Thus, U.S. Pat. No. 5,178,848 discloses a process for producing lithium metatungstate in which an aqueous solution of lithium monotungstate is treated with a cation extractant to lower the pH value of the solution to from 3.5 to 5.0 to produce a dilute solution of lithium metatungstate. In a subsequent step, the dilute solution is concentrated by removing water, and it is suggested to use evaporation by heating, vacuum treatment, heating under vacuum, reverse osmosis, or a combination of such methods for this step. The formation of undesirable lithium paratungstate is prevented by saturating the lithium tungstate solution with colloidal tungsten trioxide.

J.-Q. Liu et al. in their article "Study on new method of the preparation of pure ammonium metatungstate (AMT) using a coupling process of neutralization nanofiltration-crystallization", which was published in Journal of Membrane Science 240 (2004), 1-9, describe a method for producing ammonium metatungstate in which an aqueous ammonium metatungstate solution is concentrated by using nanofiltration.

The isopolyanionic character of the salts of tungstic acid has the result that the different metal salts have fundamentally different properties, so that experience and knowledge gained in the production of one metal salt usually can be used only to a very limited extent in the production of other metal salts.

Therefore, it is the object of the present invention to provide a process for producing ammonium metatungstate that is an alternative to conventional methods and lowers the specific energy consumption.

Surprisingly, it has been found that this object can be achieved by performing the concentrating of the ammonium metatungstate solution in the production of ammonium metatungstate by using a reverse osmosis cell.

Therefore, the present invention firstly relates to a process for preparing ammonium metatungstate in which an aqueous ammonium metatungstate solution (A) is passed through at least one reverse osmosis cell to obtain a concentrate (C) and a permeate (P).

Surprisingly, it has been found that a concentrated ammonium metatungstate solution is obtained through the use of a reverse osmosis cell, without showing any clogging of the membrane by equilibrium shifts because of different permeabilities of various isopolytungstate ions. Accordingly, the energy-intensive evaporation step that forms an essential part in the production of ammonium metatungstate in conventional methods could be dispensed with in this way. In addition, the elimination of the evaporation step in the production of ammonium metatungstate, could successfully eliminate an essential bottleneck in the production of ammonium metatungstate, so that not only the specific energy demand is lowered, but also the production capacity could be increased, and the manufacturing cost lowered, because of shorter lead times. When the energy demand is reduced, the $CO_2$ emissions can be reduced at the same time, which immediately contributes to the sustainability of the production process.

The use of reverse osmosis cells is generally known to the skilled person. Thus, WO 2004/099087 describes a method for treating nitrate-containing waste water, in which waste water is passed through at least one reverse osmosis and/or electrodialysis cells, after preliminary cleaning for removing solids or suspended solids and separating off alkaline earth and heavy metal ions by precipitation and ion exchange, and stripping off $CO_2$ at lower pH values. Preferably, $NaNO_3$ concentrations of up to 200 g/L are obtained by reverse osmosis in a multistage countercurrent process.

Now, within the scope of the present invention, it has been found for the first time that reverse osmosis can be employed, not only to simple inorganic salts in aqueous solution, but also to metal forming isopolyanions, in which equilibria, in part complicated ones, between different species exist, which must not be disturbed by any selective ion permeability of the membrane that may occur.

Simple salts, such as NaCl, $NaNO_3$, $Na_2SO_4$, $NH_4Cl$, $NH_4NO_3$ or $(NH_4)_2SO_4$, will dissolve in water predominantly to form simple ions. The presence of such ions is independent of the concentration or pH of the solution. For elements forming complicated isopolyanions, which include niobium, tantalum and molybdenum and, in particular, also tungsten in addition to vanadium, another picture is found.

In general, the formation of isopolytungstates, proceeding from monomeric $WO_4^{2-}$, is formulated according to the following equation:

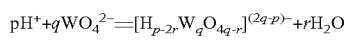

$$pH^+ + qWO_4^{2-} = [H_{p-2r}W_qO_{4q-r}]^{(2q-p)-} + rH_2O$$

The equilibria that appear depend on the pH, the concentration and the temperature of the solution. Therefore, because of the complicated inter-relationships, it has evidently been considered to date that the use of a reverse osmosis cell in the context of isopolymetallates results in local precipitations of undesirable compounds, such as tungstic acid or ammonium paratungstate, in the cell because of ion-selective permeability. The present invention overcomes this prejudice. Surprisingly, no precipitation or clogging of the membranes employed have been observed within the scope of the present invention, against the doubts of the prior art.

Within the scope of the process according to the invention, it has been found particularly advantageous to use a high-pressure reverse osmosis cell. Therefore, an embodiment of the process according to the invention is preferred in which the reverse osmosis is performed in a high-pressure reverse osmosis cell, preferably under a pressure of more than 50 bar, preferably more than 90 bar, more preferably more than 100 bar, especially more than 120 bar, specifically more than 150 bar.

The process according to the invention further has the advantage that it can be applied to conventional methods in which ammonium metatungstate is obtained by proceeding from ammonium paratungstate. Therefore, an embodiment is preferred in which the aqueous ammonium metatungstate solution (A) is obtained by the calcination of ammonium paratungstate tetrahydrate, and water leaching the calcinated material.

In order to separate solids and suspended solids from the aqueous ammonium metatungstate solution (A), it can be subjected to a filtration step. Therefore, in a preferred embodiment of the process according to the invention, the solution (A) is subjected to a filtration step before the reverse osmosis is performed.

By using the reverse osmosis cell in the process according to the invention, the energy-intensive evaporation step, which is normally required for producing a concentrated ammonium metatungstate solution, is no longer necessary. The reverse osmosis yields a concentrated ammonium metatungstate solution with a significantly reduced energy input, and the desired product can be isolated therefrom in the course of the further process, in which energy savings of more than 10% were achieved. Accordingly, in a preferred embodiment, the ammonium metatungstate is recovered by cooling the concentrate (C) obtained after the reverse osmosis. For lower quality demands, it is also possible to obtain ammonium metatungstate, for example, by spray-drying the solutions concentrated by reverse osmosis.

The process according to the invention is characterized, in particular, by its energy efficiency and the associated sustainability. This is also reflected in the process control. Thus, an embodiment is preferred in which the permeate obtained is returned into the process cycle. In this way, a high efficiency can be ensured on the one hand, and the production of waste water can be reduced on the other. Surprisingly, it has been found that only after many cycles, when trace impurities could have become enriched in the mother liquor, it is required to channel out part of the mother liquor for separating impurities. The tungsten contained in these fractions of the mother liquor is completely recycled into the process for preparing ammonium paratungstate, the starting compound for preparing ammonium metatungstate. The process according to the invention can be operated either continuously or in a batch or discontinuous mode. In order to ensure an efficient occupancy rate of the production plants, the process according to the invention is preferably operated continuously.

The surprisingly high efficiency of reverse osmosis allows for a one-stage process control, which is of advantage especially in view of the savings in cost and time. Therefore, in a preferred embodiment, the process according to the invention is operated as a one-stage process. Preferably, the efficiency of the process is further enhanced by the fact that the permeate obtained is completely recycled into the production process by using it for leaching the calcinated material, i.e., for the production of the aqueous ammonium metatungstate solution (A). Thus, it has surprisingly been found that the reverse osmosis cell can also be operated at very high pressures of 110 bar or higher, whereby concentrates having concentrations of more than 1200 g/L ammonium metatungstate can be obtained. Further, it has been found that a product loss through ammonium metatungstate contained in the permeate, for example, is avoided by the process control according to the invention. Because of the complete use of the permeate in the leaching stage, concentration of the ammonium metatungstate in the permeate or recycling the permeate in upstream process stages for producing ammonium paratungstate can be dispensed with.

To further enhance the efficiency of the process according to the invention, it may be operated as a multistage process, i.e., more than one reverse osmosis cell is flowed through. Accordingly, an embodiment is preferred in which the process according to the invention is operated in a multistage mode. In this mode, it has been surprisingly found that the usual procedure, in which the concentrate and permeate streams are guided in counter-current, is not required in the process according to the invention. The multistage process control using several reverse osmosis cells, which are preferably connected in series, further has the advantage that the reverse osmosis cells can be adapted individually to the corresponding requirements. Therefore, an embodiment of the process according to the invention is preferred in which the reverse osmosis cells in multistage process control are operated at different pressures.

Within the scope of the process according to the invention, the reverse osmosis is employed, in particular, for producing a concentrated ammonium metatungstate solution, from which the desired product ammonium metatungstate is recovered. No particular demands are to be placed on the production of the aqueous ammonium metatungstate solution. Rather, it has surprisingly been found that highly diluted solutions, as are described as advantageous in the prior art and which contain only low concentrations of ammonium metatungstate can be reacted efficiently. In this case, it has been found advantageous to connect several reverse osmosis cells in parallel at first, and then again to connect such blocks in series stage by stage. As the number of stages increases, the number of cells connected in parallel per stage may decrease. In the process according to the invention, diluted ammonium tungstate solutions, in particular, as obtained in some production methods may also be employed. For concentrating such solutions, especially particularly diluted ammonium metatungstate solutions that contain less than 100 g/L or even less than 50 g/L or even less than 25 g/L, the process according to the invention provides in a preferred embodiment that several reverse osmosis cells are connected in parallel, and the thus formed block is connected in series upstream of an individual reverse osmosis cell.

In a preferred embodiment, the concentration of ammonium metatungstate in the aqueous solution (A) before the osmosis cell is passed through is from 150 to 550 g/L, preferably from 250 to 500 g/L, more preferably from 200 to 300 g/L. The use of the reverse osmosis cell according to the invention surprisingly enables particularly highly concentrated ammonium metatungstate solutions to be obtained and thus an efficient process operation to be achieved. Therefore, an embodiment is preferred in which the concentration of ammonium metatungstate in the concentrate (C) after the osmosis cell has been passed through is at least 1200 g/L, preferably at least 1500 g/L.

Within the scope of the process according to the invention, it has further been found uncritical if the aqueous solution (A) contains small amounts of foreign ammonium salts, such as $NH_4Cl$, $NH_4NO_3$ or $(NH_4)_2SO_4$, as obtained in some methods for preparing the aqueous solution (A). Surprisingly, it has been shown that the presence of the foreign salts does in no way adversely affect the process according to the invention.

No particular demands are to be placed on the reverse osmosis cell used in the process according to the invention. However, it has been found advantageous if a reverse osmosis cell is used that contains membranes in the form of a spiral-wound membrane. Therefore, an embodiment is preferred in which the reverse osmosis cell contains at least one membrane in the form of a spiral-wound membrane.

The present invention further relates to the use of a reverse osmosis cell in the preparation of ammonium metatungstate. More preferably, the reverse osmosis cell is a high-pressure reverse osmosis cell, which preferably contains at least one membrane in the form of a spiral-wound membrane.

The present invention further relates to a device for performing the process according to the invention, wherein the device contains at least one reverse osmosis cell, preferably a high-pressure reverse osmosis cell.

FIG. 1 is a diagrammatic view of one embodiment of a device for performing a process for preparing ammonium metatungstate (AMT).

The present invention is described in more detail with reference to FIG. 1 and the following Example, which is not to be construed as limiting the inventive idea in any way, however.

A storage container (1), which is equipped with a stirrer (2) and heat exchanger (3), is at first filled through the valve (4) with diluted AMT solution up to its maximum working volume. After the filling has been completed, the metering pump (5) conveys the solution present in the storage container (1) to a high-pressure pump (6), which forwards the so-called feed solution into an internal cycle driven by the circulation pump (7), in which the feed is mixed with recycled concentrate and supplied to a high-pressure reverse osmosis cell (8), which contains one or more spiral-wound membranes consisting of semipermeable membranes (9) and supporting structures in a pressure pipe. Water passes through the membrane and leaves the total system under gravity as a permeate stream (10). In the internal cycle, the remaining concentrate stream (11) is divided through the pressure control (12) and the control valve (13) into recycled concentrate (17) for the internal cycle and channeled-out concentrate (14). If the plant is operated in batch mode, the concentrate channeled out from the internal cycle maintained by the pump (7) flows back into the storage container (1) under gravity while valve (15) is closed and valve (16) is open. In the storage container, the filling level becomes lower in the batch mode because of the permeate amount being channeled out of the total system over the outer balance limit, so that the AMT concentration increases with time up to a desired preset value, and the batchwise concentration is complete. The internal circulation pump (7) and, in particular, the high-pressure pump supply work to the inner cycle, which leads to significant heating. Part of this excess energy is dissipated as heat with the permeate flow from the total system over the outer balance limit, and the rest is withdrawn from the recycled concentrate (14) through the heat exchanger (3). A constant temperature in the inner cycle is ensured by the temperature control (18), by which the supply of cooling water is controlled.

Alternatively, the system described may also be operated in a continuous mode, in which a feed solution (diluted AMT solution) is permanently supplied to the storage container (1) through the valve (4), and the concentrate formed is led off like the permeate through the opened valve (15) while valve (16) is closed.

EXAMPLE

The storage container (1) was filled with 500 liters of diluted AMT solution having a density of 1.20 g/cm$^3$ (at 20° C.). The concentration was 242.5 g of AMT/L. At a predetermined pressure of 110 bar, controlled by the pressure control (12), a concentrate having a density of 2.40 g of AMT/L (measured at 35° C.) was prepared. The concentration of AMT was 1682 g of AMT/L. About 427 liters of permeate was separated off. An analysis of the permeate showed a tungsten content of 1.35 g/L (0.64%) without a change of the $NH_4$/W ratio being observed. The ammonium content as determined by the Kjeldahl method was 0.067 g/L. As the analysis of the permeate shows, the small loss of tungsten did not cause any significant change in the chemical composition. Since the chemical composition has remained unchanged, the permeate could be recycled completely during operation for preparing the diluted AMT solution. The small loss of tungsten through the membrane of less than 1% shows as a further advantage the economic advantages associated with the process according to the invention.

As can be seen from the Example described, the process control according to the invention causes only a very small loss of tungsten, while high concentrations of ammonium metatungstate can be achieved.

The invention claimed is:

1. A process for preparing ammonium metatungstate (AMT), characterized in that an aqueous ammonium metatungstate solution (A) is concentrated by passing the aqueous ammonium metatungstate solution (A) through at least one high-pressure reverse osmosis cell to obtain a concentrate (C) containing AMT and a permeate (P), characterized in that said at least one reverse osmosis is performed under a pressure of more than 50 bar.

2. The process according to claim 1, characterized in that said aqueous ammonium metatungstate solution (A) is obtained by the calcination of ammonium paratungstate tetrahydrate, and water leaching the calcinated material.

3. The process according to claim 1, characterized in that said solution (A) is subjected to a filtration step before the reverse osmosis is performed.

4. The process according to claim 1, characterized in that said ammonium metatungstate is recovered by cooling the concentrate (C).

5. The process according to claim 4, characterized in that the permeate obtained is recycled into the process cycle.

6. The process according to claim 1, characterized in that the process is operated continuously.

7. The process according to claim 1, characterized in that the process is operated continuously and in a one-stage mode.

8. The process according to claim 1, characterized in that the process is operated in a multistage mode.

9. The process according to claim 8, characterized in that, when the process is operated in a multistage mode, the reverse osmosis cells are operated at different pressures.

10. The process according to claim 1, characterized in that the concentration of ammonium metatungstate in the aqueous solution (A) is from 150 to 550 g/L.

11. The process according to claim 1, characterized in that the concentration of ammonium metatungstate in the concentrate (C) is at least 1200 g/L.

12. A method of preparing ammonium metatungstate, wherein the method comprises passing an ammonium metatungstate solution through a reverse osmosis cell, characterized in that said at least one reverse osmosis is performed under a pressure of more than 50 bar.

13. The method according to claim 12, characterized in that said reverse osmosis cell contains at least one membrane in the form of a spiral-wound membrane.

* * * * *